(12) United States Patent
Johnson

(10) Patent No.: US 6,834,749 B1
(45) Date of Patent: Dec. 28, 2004

(54) DRIVE COUPLER WITH LOCK-OUT CAPABILITY

(75) Inventor: Chad M. Johnson, Westchester, IL (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/639,042

(22) Filed: Aug. 12, 2003

(51) Int. Cl.$^7$ ............................................. F16D 21/04
(52) U.S. Cl. ..................... 192/20; 192/69.1; 192/69.82; 192/200
(58) Field of Search ...................... 192/20, 69.1, 69.82, 192/200; 111/184

(56) References Cited

U.S. PATENT DOCUMENTS

| | | | | |
|---|---|---|---|---|
| 268,807 A | * | 12/1882 | Landis | 464/69 |
| 2,097,062 A | * | 10/1937 | Harris | 464/109 |
| 2,870,615 A | * | 1/1959 | Walk | 464/109 |
| 3,362,143 A | * | 1/1968 | Gullickson | 56/12.6 |
| 3,884,050 A | * | 5/1975 | Borcuk | 464/137 |
| 4,547,177 A | * | 10/1985 | Ueno | 464/69 |
| 5,613,321 A | * | 3/1997 | Rizkovsky | 49/139 |
| 6,003,454 A | * | 12/1999 | Ozers et al. | 111/184 |

* cited by examiner

*Primary Examiner*—Saul Rodriguez
(74) *Attorney, Agent, or Firm*—Rebecca Henkel; Brant T. Maurer

(57) ABSTRACT

A drive coupling system and method of engaging/disengaging the coupling provided by a drive coupling system are disclosed. The drive coupling system includes first and second torque couplers coupled respectively to drive and driven shafts. One of the couplers includes a support and first and second members rotatably coupled to the support, where each coupler includes a respective extension and a respective plurality of gear teeth. The first and second members are capable of being respectively rotated to first and second rotational positions beyond which the first plurality of gear teeth are able to at least begin to slip out of alignment with the second plurality of gear teeth. The relative slipping of the first plurality of gear teeth with respect to the second plurality of gear teeth is limited due to contact occurring between the extensions. As the relative slipping occurs, teeth of the two members become locked.

20 Claims, 6 Drawing Sheets

DRIVE COUPLER WITH LOCK-OUT CAPABILITY

STATEMENT REGARDING FEDERALLY SPONSORED RESEARCH

Not applicable.

CROSS-REFERENCE TO RELATED APPLICATIONS

Not applicable.

FIELD OF THE INVENTION

The present invention relates to rotatable drive arrangements. In particular, the present invention relates to a rotatable drive arrangement having a torque coupler which enables the driven portion of the arrangement to enter into and remain in each of an engaged state and a disengaged state while the driven portion is installed in relation to the drive portion.

BACKGROUND OF THE INVENTION

A variety of different machines employ drive coupling systems in which the driven portion of the coupling system must be periodically separated and removed from the drive train or drive portion of the system for various reasons. For example, drive coupling systems can be employed in conventional plate planters with seed meters. During planting, the seed meter often fills with dirt, chaff and other foreign matter, and consequently it is typically necessary to periodically remove the seed meter for cleaning. Also, it sometimes is necessary to remove the seed meter in order to change a seed plate of the seed meter.

U.S. Pat. No. 6,003,454 to Ozers et al. (hereinafter referred to as "the '454 patent"), which issued on Dec. 21, 1999, is assigned to the assignee of the present patent application, and is hereby incorporated by reference herein, discloses a drive coupling system that can be employed in a conventionally known plate planter with a seed meter. The drive coupling system disclosed in that patent allows the driven portion to be removed/uninstalled or inserted/installed simply by vertically lifting or lowering the driven shaft relative to the drive shaft along a direction that is other than along the axes of the shafts.

More specifically, the system of the '454 patent includes first and second torque couplers on a drive shaft and driven shaft, respectively, each of which includes a pair of lugs or protrusions. When the driven portion (including the second torque coupler and driven shaft) is installed relative to the drive portion, the lugs of each torque coupler are positioned diametrically opposite one another on the respective torque coupler. When installed, the distance between the lugs of each pair is the same, such that the lugs of each pair are aligned with and interface respective lugs of the other pair, thus allowing torque provided via the drive shaft and first torque coupler to be transferred to the second torque coupler and the driven shaft.

While the pair of lugs of the first torque coupler are attached to the remainder of the first torque coupler at specific positions, the pair of lugs of the second torque coupler are respectively mounted on first and second gears that are rotatably mounted on the remainder of the second torque coupler. The gears are engaged with one another so that the gears can only rotate relative to one another in opposite directions. Springs are employed tending to rotate the gears so that the lugs of the second torque coupler tend to move toward their default, diametrically-opposed positions. However, because the lugs of the second torque coupler are mounted on the rotatable gears, the lugs need not and do not remain in their diametrically opposed positions when force is applied to remove or install the driven shaft with respect to the drive shaft. Rather, the lugs move relative to one another so that one or both of the lugs can slip past the lugs of the first torque coupler as the second coupler is installed or removed.

Although in some applications it is desirable for the driven portion to be engaged to the drive portion whenever the driven portion is installed, this is not necessarily the case. Rather, in some applications it is desirable for the driven shaft to be disengaged from the drive shaft such that rotation of the drive shaft does not produce rotation of the driven shaft, even though the driven shaft remains installed in relation to the drive shaft. For example, in the case of a planter pulling a seed meter, while it may be desirable for the seed meter to operate to distribute seeds as the planter traverses most rows of a field, it may nevertheless be desirable for the seed meter to not distribute seeds with respect to certain rows of the field. Given the inconvenience of remove the seed meter each time the planter enters one of these rows, it would be desirable if the driven shaft could be temporarily disengaged from the drive shaft without entirely uninstalling the seed meter.

To address this need, the '454 patent (particularly with reference to FIGS. 10–15 of that patent) discloses different "lock-out mechanisms" that allow for a driven portion to be disengaged from a drive portion even thought the driven portion remains installed with respect to the drive portion. In one embodiment shown in FIGS. 10–11 of the '454 patent, a key lock 570 slidably mounted on a support portion and is capable of sliding in and out of a detent 568 on one of the gears when the gears are rotated so that the lugs are rotated inwards toward one another. When the key lock 570 is slid into the detent 568, the gears are prevented from rotating so that lugs are rotated outwards, despite the springs on the gears. Consequently, the lockout mechanism when engaged maintains the lugs of the second torque coupler in an inward position such that the driven portion is disengaged from the first torque coupler.

An alternate embodiment of lock-out mechanism shown in FIGS. 12–15 of the '454 patent employs a shaft that can be upwardly or downwardly actuated with respect to the support when the gears are rotated inward so that the lugs on the gears are rotated inward. If the shaft is upwardly actuated, then the shaft blocks outward rotation of the gears and thus maintains the lugs in their inward position such that the driven portion is disengaged from the first torque coupler. Additionally, the '454 patent indicates that one or both of the gears could have an additional hook member or other means that was adapted to releasibly engage the other of the gears to maintain the lugs of the gears in their inward position such that the driven portion is disengaged from the torque coupler.

The lock-out mechanisms shown in the '454 patent are advantageous in that they make it possible for the driven portion to be disengaged and engaged from the drive portion regardless of whether the driven portion is installed. However, each of the lock-out mechanisms of the '454 patent requires one or more specialized components that are mounted on the second torque coupler and/or one or both of the gears in order to provide the functionality (e.g., the key lock, shaft, hook member or other means). Further, in each embodiment, at least one of these additional components must be slidably or otherwise movably mounted on the second torque coupler and/or one or both of the gears so that the lock-out mechanism can be engaged or disengaged. Engagement or disengagement of the driven portion with respect to the drive portion necessarily involves a separate step in which one or more of these specialized components are moved in relation to one or both of the gears.

Because these lock-out mechanisms require these specialized components and additional step(s) of operation to engage or disengage the driven portion, use of the lock-out mechanisms adds to the cost and complexity of manufacturing the drive coupling systems, adds to the complexity of operating the drive coupling systems, and further can add to maintenance costs. For these reasons, it would be advantageous to have an improved drive coupling system that had a lock-out mechanism that did not require the specialized components shown in the '454 patent.

SUMMARY OF THE INVENTION

The present inventor has recognized that it would be possible to modify the design of the gears employed on the driven torque coupler from the designs disclosed in the '454 patent in such a manner that the gear teeth themselves would be capable of operating as a lock-out mechanism. In particular, the present inventor has recognized that, if a sufficient number of gear teeth are missing from the gears of the torque coupler, then the gears would be capable of slipping or falling out of alignment with respect to one another as the lug extensions (and lugs) of the torque coupler were rotated toward one another. Additionally, the present inventor has recognized that, if the gears further include appropriate protrusions that preclude the gears from slipping too far despite missing teeth, then it would be possible for the gears to become misaligned just so much as to become locked in place with respect to one another, particularly if the shape of the gear teeth is configured to facilitate such locking action.

In particular, the present invention relates to a drive coupling system that includes a rotatable drive shaft, a driven shaft, a first torque coupler coupled to one of the drive shaft and the driven shaft, and a second torque coupler coupled to the other of the drive shaft and the driven shaft. The first torque coupler includes first and second lugs, while the second torque coupler includes a support, a first member rotatably coupled to the support and including a first extension and a first plurality of gear teeth that extend only partly around the first member, and a second member rotatably coupled to the support and including a second extension and a second plurality of gear teeth that extend only partly around the second member. The first and second members are capable of being respectively rotated to first and second rotational positions beyond which the first plurality of gear teeth are able to at least begin to slip out of alignment with the second plurality of gear teeth. The relative slipping of the first plurality of gear teeth with respect to the second plurality of gear teeth is limited due to contact occurring between the first and second extensions as the slipping occurs. As the relative slipping occurs, a first gear tooth of one of the first and second pluralities of gear teeth interfaces a second gear tooth of the other plurality of gear teeth so that the first member becomes locked in position in relation to the second member.

The present invention additionally relates to a lock-out mechanism for implementation in a drive coupling system. The lock-out mechanism includes a support; first and second members having first and second pluralities of gear teeth, respectively, first and second extensions, respectively, and first and second lugs, respectively; and means for biasing the first and second members toward rotational positions so that the first and second lugs are in first and second positions, respectively. Each of the first and second members is rotatably coupled to the support and, due to engagement of at least some of the gear teeth of the first and second pluralities of gear teeth, the first and second members are at least partly restricted to rotational motions that are in opposition to one another. Further, the first and second members are capable of being rotated and locked in position so that the first and second lugs are locked in third and fourth positions, respectively. Additionally, the first and second members are locked in position when the first and second pluralities of gear teeth of the first and second members slip out of gear alignment so that a first gear tooth of one of the first and second pluralities of gear teeth is locked in relation to a second gear tooth of the other of the first and second pluralities of gear teeth.

The present invention further relates to a method of disengaging a coupling of first and second torque couplers of a drive coupling system in a work vehicle, where the drive coupling system includes a drive shaft, a driven shaft, and the first and second torque couplers respectively coupled to respective ones of the drive and driven shafts, where first and second lugs are fixedly positioned on a first support of the first torque coupler, the first and second members are rotatably coupled to a second support of the second torque coupler, and third and fourth lugs are fixedly positioned on the first and second members, respectively, and where the first and second members respectively include first and second pluralities of gear teeth to allow for engagement between the first and second members, the first and second members being at least partly restricted by the pluralities of gear teeth to rotational movements in opposite directions in relation to one another. The method includes applying a torque to at least one of the first and second members so that the first and second members respectively rotate to positions beyond which slipping can occur between the first and second pluralities of gear teeth of the first and second members. The method additionally includes applying a further torque to one of the first and second members so that a first gear tooth of the one member becomes wedged against a second gear tooth of the other of the first and second members, wherein the wedging of the first gear tooth against the second gear tooth locks both teeth and both members substantially in their respective positions.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DESCRIPTION OF THE PREFERRED EMBODIMENT

The figures and corresponding text below describe several exemplary embodiments of the invention. However, it should be understood that the present disclosure is only exemplary of the invention and is not intended to be limiting and that the claims below should be referred to for a full understanding of the scope of the invention.

Figure 1:
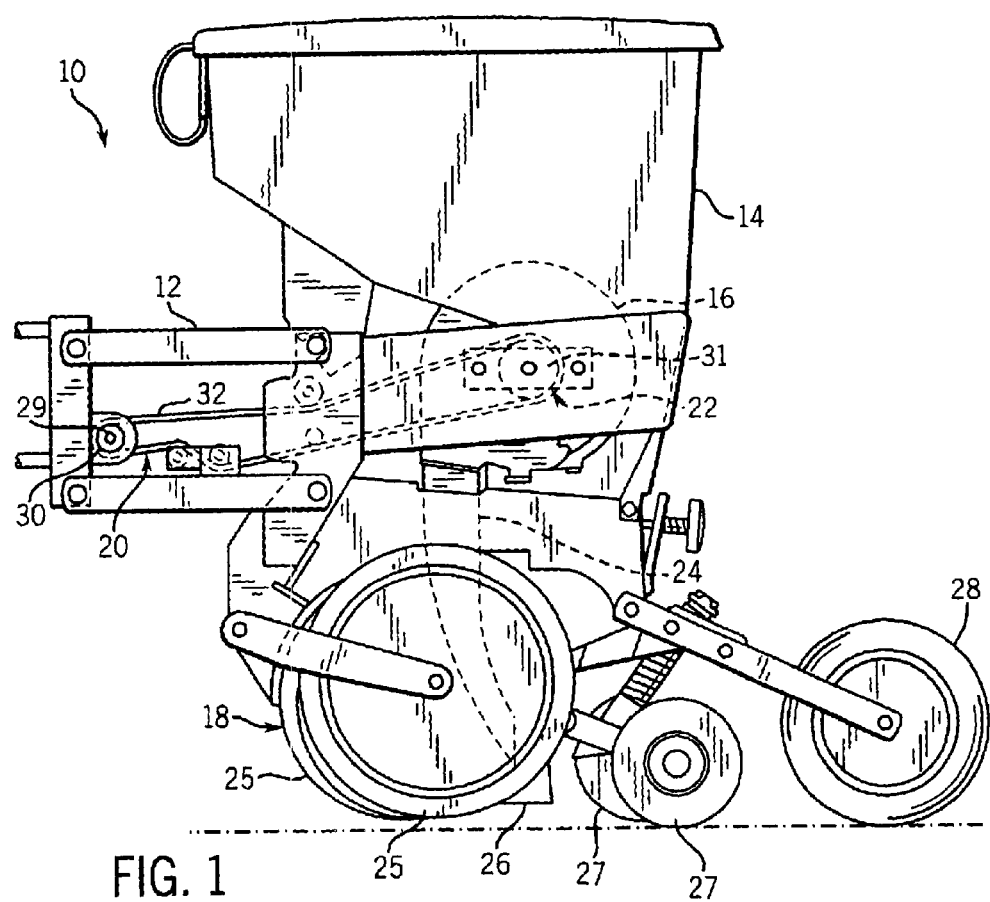
FIG. 1 is a side elevational view of a planter including the drive coupling system of the present invention.

FIG. 1 is a side elevational view of a planter row unit 10 including a frame 12, a hopper 14, a seed meter 16, a furrow opening and closing mechanism 18, a drive train 20, and a drive coupling system 22. The frame 12 generally comprises a support structure configured for supporting the hopper 14, seed meter 16, furrow opening and closing mechanism 18, drive train 20 and drive coupling system 22. As can be appreciated, the frame 12 may have a variety of different sizes, shapes and configurations depending upon the type of vehicle pulling the planter row unit 10 as well as the size, configuration and number of the hopper(s) 14, seed meter 16 and coupling systems 22.

The hopper 14 is supported by the frame 12 and provides a container for storing and dispensing seed to the seed meter 16. The seed meter 16 is conventionally known and is attached to the hopper 14 substantially below the hopper 14. As shown with respect to FIG. 2, the seed meter 16 includes a housing 34 adapted to be mounted to the frame 12 and a seed disc or plate 35 that is rotatably supported within the housing 34. The seed plate 35 is rotatably driven by the drive train 20 via the drive coupling system 22. Upon being rotatably driven by the drive train 20, the seed plate 35, carries, meters and dispenses seeds through a chute 24 to the furrow created by the furrow opening and closing mechanism 18 in a conventionally known manner.

The furrow opening and closing mechanism 18 is conventionally known and is mounted to the underside of the frame 12. The furrow opening and closing mechanism 18 generally includes a pair of laterally spaced furrow opening discs 25, an opener chute 26, a pair of laterally spaced furrow closer discs 27 and a press wheel 28. The furrow opening discs 25 and opener chute 26 create a furrow in the soil in a conventionally known manner. Once seeds have been deposited at a controlled rate by the seed meter 16 into the furrow via the chute 24, the closer discs 27 close the furrow together and over the seeds. The press wheel 28 compacts the soil closed over the seeds. As will be appreciated, the planter row unit 10 may alternatively include other types of mechanisms for implanting the seeds into the ground, such as a runner-type opener for creating a furrow in the ground.

The drive train 20 is conventionally known and generally includes a drive shaft 29, a sprocket 30, a sprocket 31 and a chain 32. The drive shaft 29 preferably comprises an elongate bar rotatably supported by the frame 12 across the width of the planter row unit 10. The drive shaft 29 is itself rotatably driven in a conventionally known manner so as to drive the sprocket 31. The sprocket 31 is coupled to the sprocket 30 via the chain 32. The sprocket 31 is rotatably mounted to the frame 12 adjacent the seed meter 16, and is coupled to the seed meter 16 by the disengageable drive coupling system 22. As can be appreciated, the drive train 20 may have various other well-known configurations for rotatably driving the seed meter 16 via the disengageable drive coupling system 22. For example, the drive train 20 may alternatively comprise a conventionally known sheave and belt arrangement or may comprise a conventionally known gear train. Also, for example, the drive train 20 can alternatively include a flexible drive shaft.

The disengageable drive coupling system 22 extends between the sprocket 31 and the seed meter 16. As shown and described in detail hereafter, the disengageable drive coupling system 22 automatically disengages without the need for manual assistance to permit removal of the seed meter 16 and the hopper 14 from the frame 12. The disengageable drive coupling system 22 also automatically reengages to couple the sprocket 31 to the seed meter 16 when the seed meter and the hopper 14 are reinstalled on the frame 12. Moreover, the disengageable drive coupling system 22 enables the seed meter 16 and the hopper 14 to be separated from or reinstalled on the frame 12 by simple vertical movement of the seed meter and hopper relative to frame.

Figure 2:
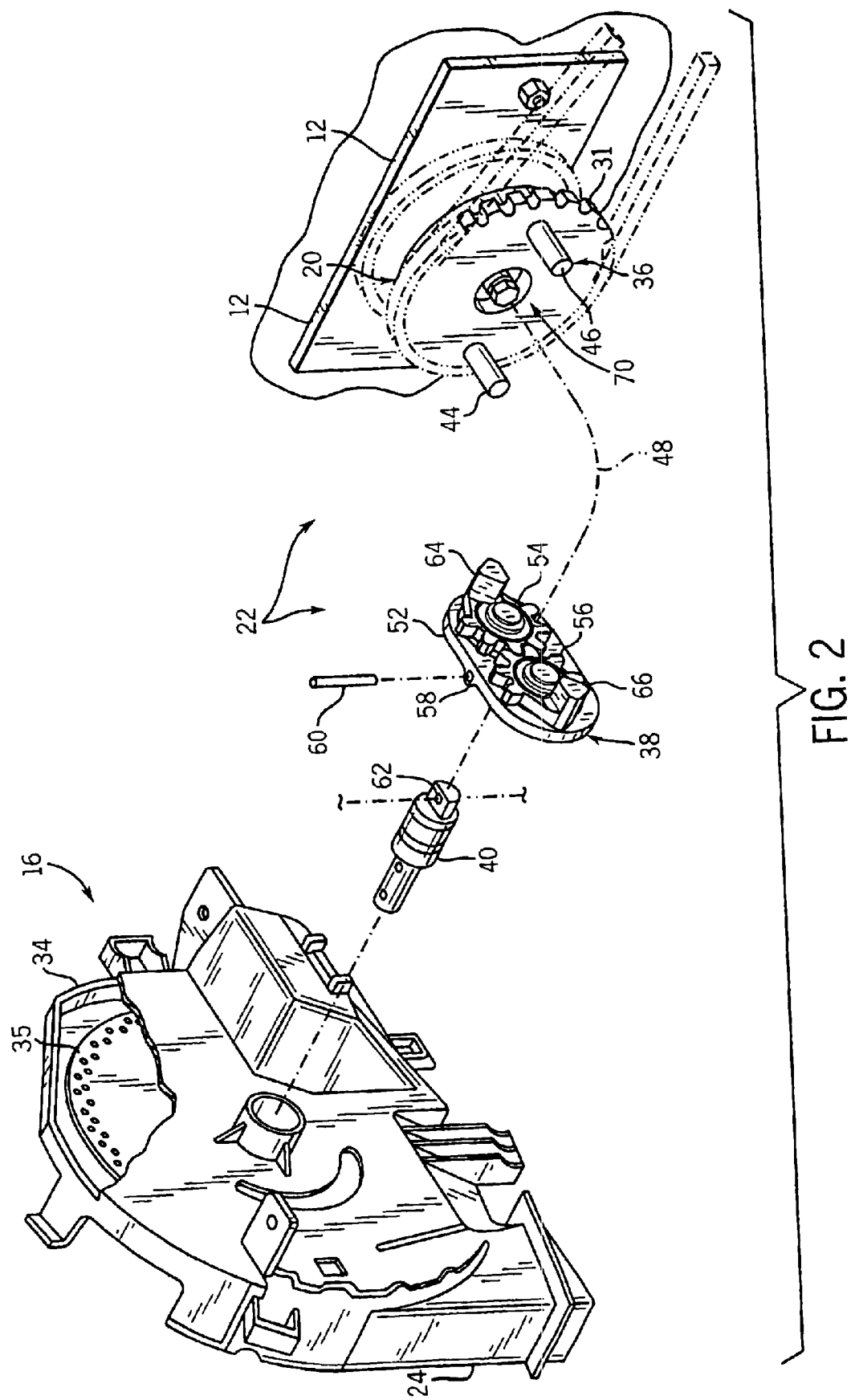
FIG. 2 is an exploded fragmentary perspective view of the planter of FIG. 1 illustrating the drive coupling system.

FIG. 2 is an exploded fragmentary perspective view of the planter row unit 10 illustrating the disengageable drive coupling system 22 in greater detail. The drive coupling system 22 generally includes a drive coupler 36, a driven coupler 38 and a driven shaft 40. The drive coupler 36 comprises two spaced lugs 44, 46 (also known as protuberances or pawls) operably coupled to the sprocket 31 of the drive train 20 and adapted to engage the driven coupler 38. In the exemplary embodiment illustrated, the lugs 44 and 46 obliquely, and preferably perpendicularly, extend directly from a face of the sprocket 31 and are spaced apart from one another on opposite sides of a central axis 48 by approximately 180 degrees.

In alternate embodiments (not shown), the lugs 44, 46 can obliquely extend from a separate supporting member rotatably coupled to the drive train 20 via a drive shaft such that the lugs 44, 46 are rotatably driven about the axis 48 by the drive train 20. Further, depending upon the configuration of the driven coupler 38, the lugs 44, 46 can alternatively be spaced apart from one another by different distances or degrees about the axis 48. Additionally, depending upon the configuration of the driven coupler 38, the lugs 44, 46 can be supported by a separate supporting member for rotation about the axis 48, such that the lugs 44, 46 radially project outward from the axis 48 or inward toward the axis 48.

As shown in U.S. Pat. No. 6,003,454, which issued on Dec. 21, 1999 to Ozers et al., and which is hereby incorporated by reference herein, the driven coupler 38 releasibly engages the drive coupler 36 and transmits torque from the drive coupler 36 to the driven shaft 40. The driven coupler 38 generally includes a support 52 and two members 54, 56. The support 52 rotatably supports the members 54 and 56 and is configured for being non-rotatably coupled to the driven shaft 40. In the exemplary embodiment illustrated, the support 52 is configured for being keyed with the driven shaft 40. The support 52 further includes a pair of spaced and aligned bores 58 sized for receiving an elongate pin 60 which extends through the bores and through a corresponding bore 62 within the driven shaft 40 to further secure the driven shaft 40 to the support 52. Alternatively, the support 52 can be non-rotatably coupled to the drive shaft 40 by various other attachment means or can be integrally formed as part of a single unitary body with the driven shaft 40.

Figure 4:
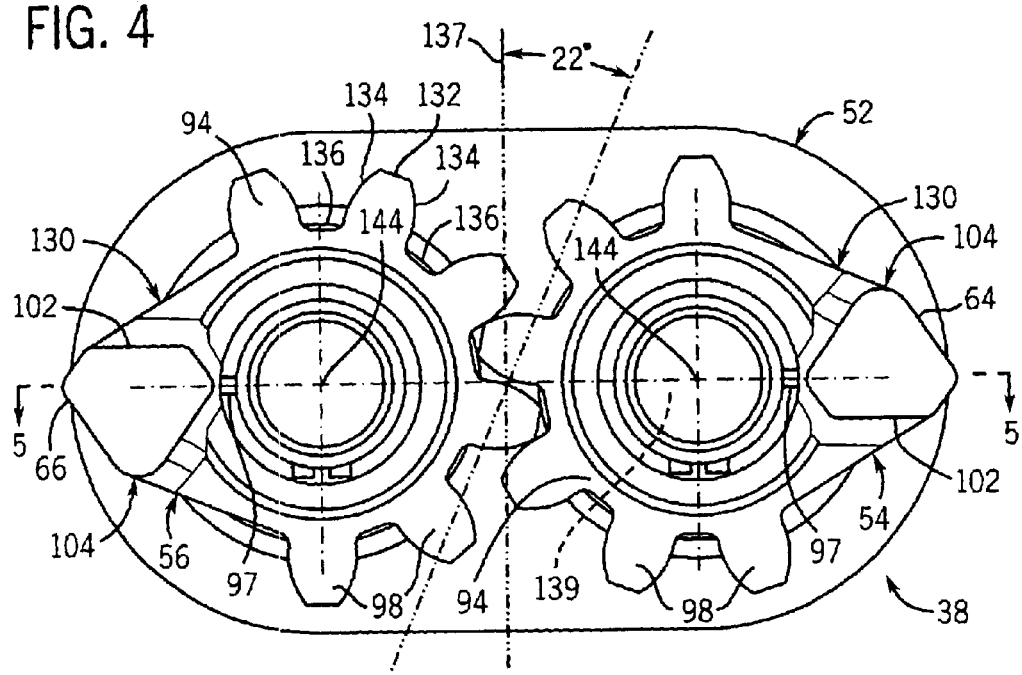
FIG. 4 is a front elevation view of the driven coupler of FIG. 3.

Each of the members 54 and 56 is rotatably coupled to the support 52. The members 54,56 rotationally engage one another so that, while the members can be rotated in respectively opposite rotational directions, the members cannot be rotated any significant amount in the same rotational direction (e.g., both clockwise or both counterclockwise). The member 54 includes a lug 64, also known as a protuberance or pawl, while the member 56 includes a lug 66. In the present embodiment, the lugs 64 and 66 obliquely, and preferably perpendicularly, extend from faces of members 54 and 56, respectively. When the members 54,56 are rotated to a torque transmitting position (as shown by FIGS. 2 and 4), the lugs 64 and 66 are positioned for engaging lugs 44 and 46, and are spaced apart 180 degrees relative to one another about the axis 48. Because the members 54,56 engage one another to prevent simultaneous rotation in the same direction, rotation of the lugs 44,46 can be communicated to the support 52 when the lugs 64,66 of the members 54,56 are in contact with the lugs 44,46.

Further, because the members 54,56 are capable of moving in opposite rotational direction, the driven coupler 38 can be easily installed and removed relative to the drive coupler 36. In particular, when the lugs 44 and 46 are in engagement with the lugs 64 and 66 and when the couplers 36 and 38 are moved relative to one another, the lugs 64 and 66 as well as the members 54 and 56 rotate in opposite directions to move the lugs 64 and 66 closer together such that the linear distance separating those lugs is less than the linear distance separating the lugs 44 and 46. As a result, at least one of the lugs 64 and 66 can be moved through an opening 70 existing in between the lugs 44 and 46.

Because the driven coupler 38 includes resilient elements (discussed below with respect to FIG. 3) that bias the members 54 and 56 toward the torque transmitting position, the lugs 64,66 tend to return to the torque transmitting position after passing through the opening 70. Consequently, the couplers 36 and 38 are able to automatically engage one another and automatically disengage one another upon movement of the couplers 36 and 38 relative to one another in a direction oblique to the axis 48. More specifically, upon being vertically lowered relative to the drive coupler 36, the lugs 64 and 66 of the driven coupler 38 engage the lugs 44 and 46 and are thereby repositioned with respect to the lugs 44 and 46 to engage those lugs on opposite sides of the axis 48 for transmitting torque from the drive train 20 to the driven shaft 40. Conversely, upon being lifted relative to the drive coupler 36, the lugs 64 and 66 of the driven coupler 38 automatically reposition themselves with respect to the lugs 44 and 46 so as to automatically disengage the lugs 44 and 46 to enable the driven coupler 38 and any associated component, such as the seed meter 16 and the hopper 14 (shown in FIG. 1), to be separated from the drive coupler 36 and its associated components including the drive train 20 and frame 12.

The driven shaft 40 is an elongate shaft having one end non-rotatably coupled to the support 52 concentrically about the axis 48 and having a second end coupled to the seed plate 35. The driven shaft 40 transmits torque from the support 52 to the seed plate 35. In operation, the drive train 20 transmits torque to the drive coupler 36, which in turn transmits torque to the driven coupler 38. The driven coupler 38, in turn, transmits torque across the driven shaft 40 to the seed plate 35.

Figure 3:
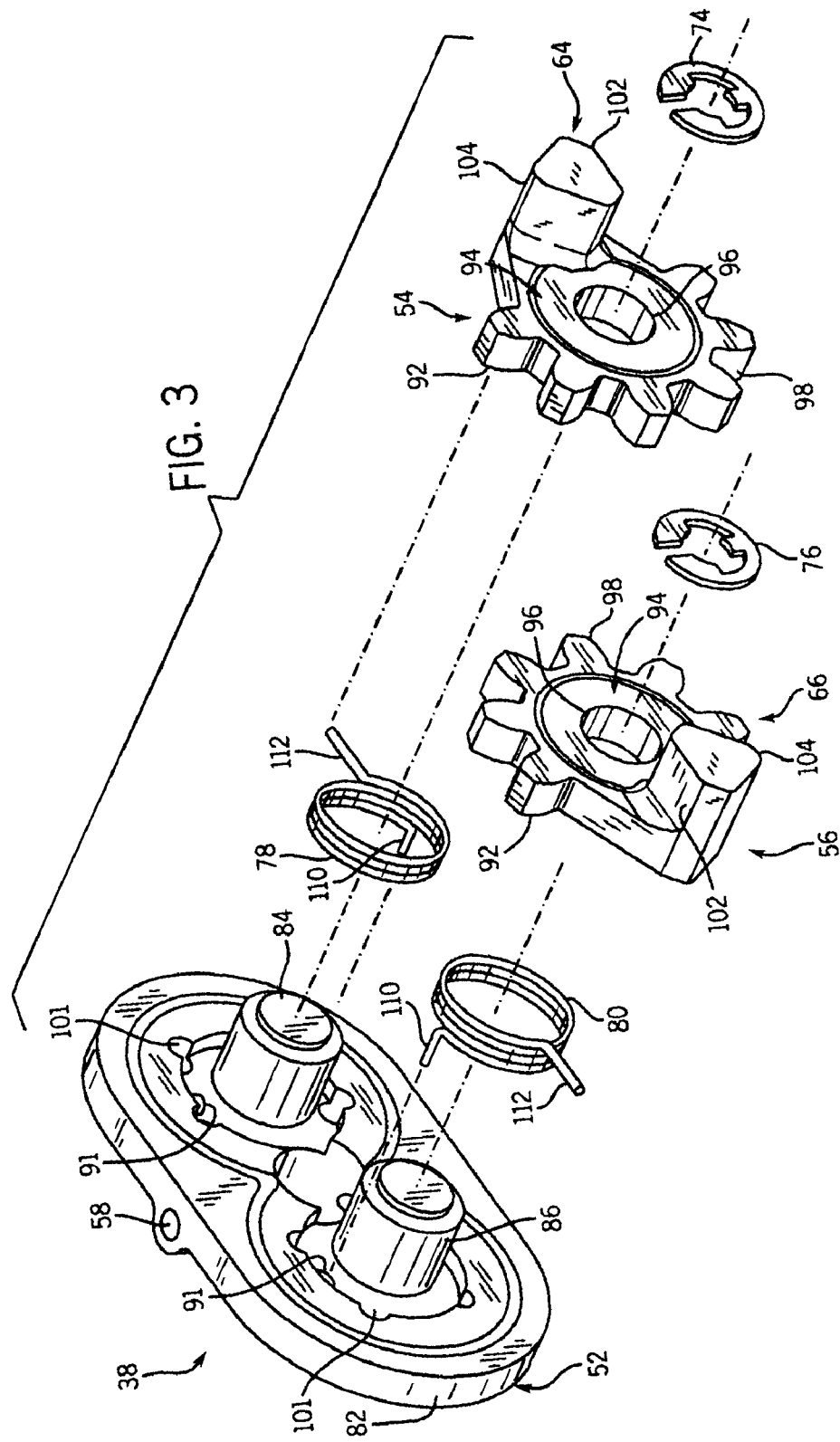
FIG. 3 is an exploded perspective view of a driven coupler of the drive coupling system of FIG. 2.
Figure 5:
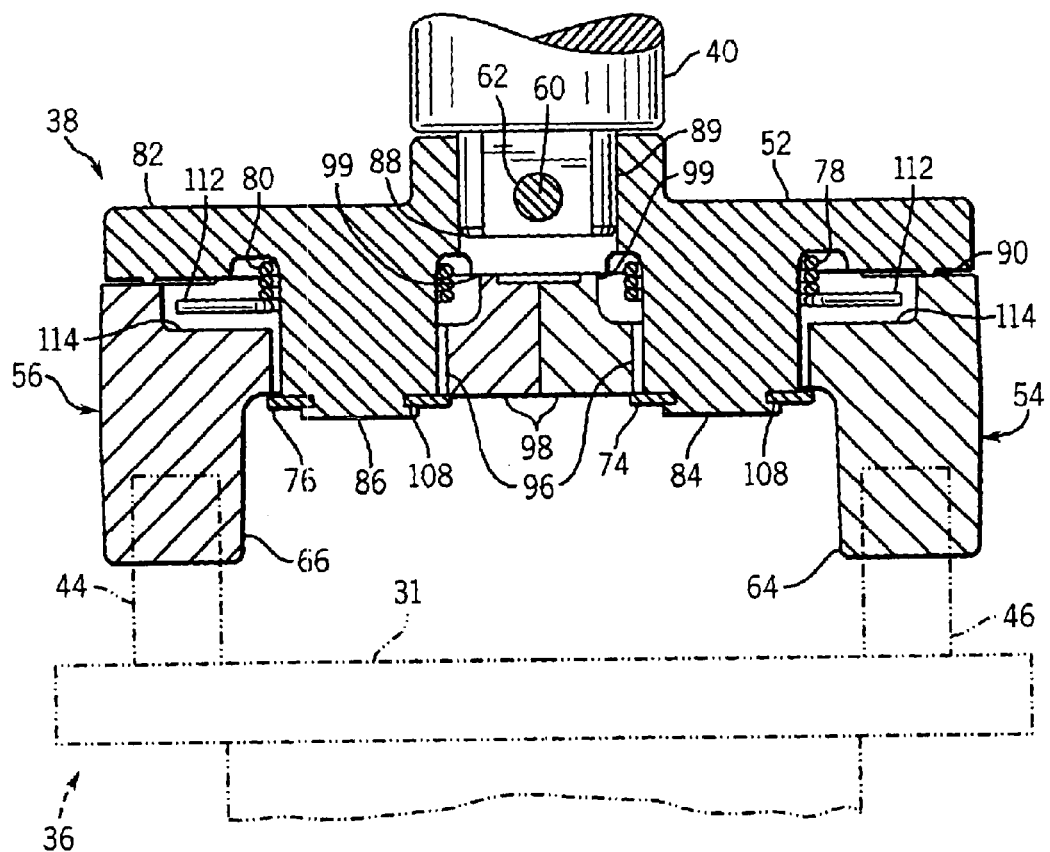
FIG. 5 is a sectional view of the driven coupler of FIG. 4 taken along lines 5—5 of FIG. 4, where the driven coupler is shown to be connected to a driven shaft (shown in cut-away) and in engagement with a drive coupler (shown in phantom)

FIGS. 3–5 illustrate the driven coupler 38 in greater detail. As shown by FIG. 3, the driven coupler 38 more specifically includes the support 52, the members 54, 56, two retainers 74, 76 and two resilient elements 78, 80. The support 52 further includes a base 82 and two hubs or spindles 84, 86. As best shown by FIG. 5, the base 82 is configured for being non-rotatably coupled to the driven shaft 40 and, in the present embodiment, includes a bore 88 configured for receiving an axially projecting lug 89 of the driven shaft 40. The bore 88 and the lug 89 are preferably noncircular such that the base 82 is keyed to the driven shaft 40. In alternate embodiments, the base 82 may be configured for being pinned or otherwise nonrotatably secured to the driven shaft 40 by various other well-known connection methods. As further shown by FIG. 5, the lug 89 of the driven shaft 40 includes the bore 62 configured for being aligned with the bores 58 (see FIG. 2) of the base 82. The bores 62,58 receive the pin 60 to axially fix the base 82 of the support 52 to the driven shaft 40.

In addition, referring to FIG. 5 and additionally to FIG. 3, the base 82 supports the spindles 84,86 and provides a structure to which the resilient elements 78,80 are affixed. The spindles 84,86 comprise elongate, cylindrical members projecting from a face of the base 82 at spaced locations. The spindles 84,86 are configured for extending through the members 54,56, respectively, and for serving as axles for rotatably supporting the members. Although illustrated as being formed as part of a single unitary body with the base 82, the spindles 84,86 can in alternate embodiments be fixedly attached or rotatably mounted to the base 82. The spindles 84,86 respectively support the respective members 54,56 at locations such that the members can engage one another. In the exemplary embodiment illustrated in FIG. 5, the base 82 additionally includes an annular protuberance 90 projecting from the base 82 towards the members 54,56. The protuberance 90 bears against the members 54,56 to maintain the members axially centered upon the spindles 84,86. As a result, the protuberance 90 prevents the members 54,56 from binding with the base 82 of the support 52.

In the exemplary embodiment illustrated, the members 54 and 56 are substantially identical to one another. Each of members 54,56 generally comprises a spur gear having a first face 92 facing the base 82, a second opposite face 94 (facing away from the base), a concentric bore 96, a plurality of radial teeth 98 and either of the aforementioned lugs 64, 66. As best shown in FIG. 5, each of the first faces 92 of members 54 and 56 includes an annular projecting bearing surface 99 extending about the bore 96. The bearing surface 99 bears against faces 92 to support the members 54,56 against the base 82. The bearing surface 99 reduces the surface areas of the base 82 and the members 54,56 that are in contact with one another to reduce frictional drag. The bores 96 extend through the members 54 and 56 and are sized for receiving the spindles 84 and 86, for rotation about the axes of the respective spindles. As can be appreciated, the members 54 and 56 can in alternate embodiments be attached to or integrally formed to include spindles which axially project from the faces 92 and which rotate within corresponding bores formed in base 82 of support 52.

As shown in FIG. 4 in particular, in the present embodiment the radial teeth 98 largely but not entirely encircle each of the members 54 and 56. The radial teeth 98 of each of the members 54,56 are of sufficient size and shape, and are otherwise configured, so as to be able to engage the corresponding radial teeth of the other member when rotating about the axes of spindles 84 and 86. Except when the members 54,56 are rotated towards a locked state as discussed with reference to FIG. 6 below, the radial teeth 98 of the member 54 otherwise are constantly in engagement with the radial teeth of the member 56. As discussed above, the engagement of the radial teeth 98 of the members 54 and 56 prevents rotation of the members in the same rotational direction but allows rotation of the members in opposite rotational directions.

As shown in FIGS. 3 and 5, the lugs 64 and 66 obliquely project from the respective faces 94 of the respective members 54,56. In the present embodiment, each of the lugs 64 and 66 has a substantially triangular cross-section (see also FIG. 4) such that each lug includes a flat surface 102 on one side and a substantially pointed (albeit rounded-off) surface 104 on an opposing side. The lugs 64 and 66 project from the faces 94 a distance sufficient such that either of the surfaces 102 or 104 is capable of engaging and abutting either of the lugs 44 or 46 of the drive coupler 36 when the driven coupler 38 is engaged with respect to the drive coupler 36 (see FIG. 5). The lugs 64 and 66 are preferably located so as to align with the lugs 44 and 46 when the members 54 and 56 are rotated such that the lugs 64 and 66 are positioned 180 degrees apart from one another about the axis 48 (see FIG. 5).

The retainers 74 and 76 engage the spindles 84 and 86 of the members 54 and 56, respectively, to axially retain the members about the spindles. The retainers 74,76 preferably comprise conventionally known snap rings having an outer diameter greater than the diameter of the bores 96 and having an inner diameter configured to snap about grooves 108 existing on the spindles 84,86. Alternatively, other structures or mechanisms can be used to axially retain the members 54,56 about the spindles 84,86 or in relation to the base 82.

Referring particularly to FIG. 3, the resilient elements 78 and 80 are resiliently flexible or resiliently deformable members that are coupled between the support 52 and the members 54 and 56, respectively. The resilient elements 78,80 resiliently bias the members 54,56, respectively, such that the lugs 64,66 are biased into the torque transmitting position (shown in FIG. 4) in which the lugs 64,66 are linearly spaced apart from one another by a distance substantially equal to the linear distance separating the lugs 44,46 of the drive coupler 36 (see FIG. 2). With respect to the linear distance separating the lugs 64 and 66 as well as the linear distance separating the lugs 44 and 46, the term "substantially equal" means that the linear distance separating the lugs 64 and 66 is sufficiently similar to the linear distance separating the lugs 44 and 46 such that at least a portion of either of surfaces 102 or 104 abuts against and engages at least a portion of either of the lugs 44 and 46 by a sufficient amount to transmit torque.

As shown in FIG. 3, in the present embodiment the resilient elements 78 and 80 comprise conventionally known torsion springs. Each of the resilient elements 78,80 has a first end portion 110 that is configured to project into a corresponding bore/cavity or detent 91 of the base 82 (see FIG. 3) and a second end portion 112 that is configured to be received within a respective detent 97 extending within a respective face 92 of a respective oneof the members 54,56 (see FIG. 4). Although the resilient elements 78 and 80 are shown to be torsion springs, in alternate embodiments other elements and structures can be used to resiliently bias the members 54,56 and lugs 64,66 into the torque transmitting position. For example, the driven coupler 38 could in one alternate embodiment include rubber bushings positioned about the spindles 84,86 within bores 96, where the bushings resiliently twisted and deformed in response to forces rotating the members 54 and 56 out of the torque transmitting position. Other elements such as single compression springs can also be used.

Further, in lieu of the resilient elements 78 and 80 coupled between the support 52 and the members 54 and 56, respectively, the resilient elements 78 and 80 in alternate embodiments can be replaced with a single resilient element or multiple resilient elements interconnecting the members 54 and 56 to one another such that the members are resiliently biased to the torque transmitting position. For example, one alternate embodiment could include a single, elastic band affixed to each of members 54 and 56, where rotation of either of the members 54 and 56 out of the torque transmitting position stretched the band. Additionally, instead of securing the resilient elements 78,80 to the base 82 and the members 54,56 by way of the first and second end portions 110,112 and detents 91,97, in alternate embodiments the resilient elements can be nonrotatably fixed to the base and members by various other well-known fasteners or connection methods.

Figure 6:
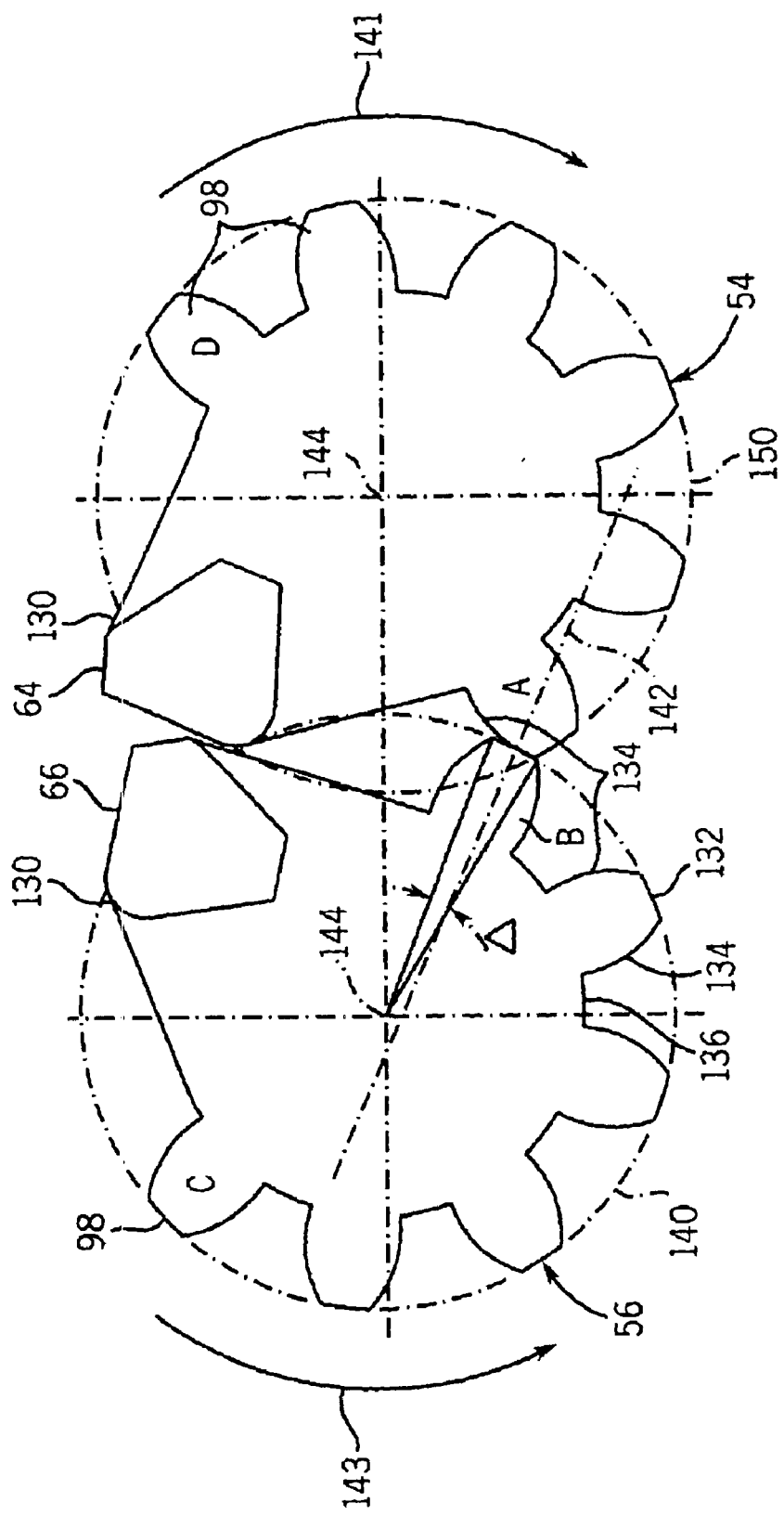
FIG. 6 is a front elevation view of first and second members of the driven coupler of FIGS. 2–5, where the members are shown to be rotated into a locked position.

As shown in FIGS. 3 and 4, and additionally in FIG. 6, while the members 54 and 56 have radial teeth 98, those teeth do not extend all of the way around the circumference of the respective members. Rather, each of the members 54, 56 has in this embodiment six radial teeth that extend approximately 210 degrees around the circumference of the respective member and additionally has an extension 130 that extends outward away from the center of the respective member within the region that otherwise could have been occupied by additional teeth. The respective lugs 64, 66 of the members 54, 56 are mounted toward the ends of the respective extensions 130. As shown in FIG. 4, in the present embodiment, the flat surfaces 102 of the lugs 64, 66 face in opposite directions when the members are in their torque transmitting position, and also the pointed surfaces 104 of the respective lugs also are in opposite directions. Further, as shown, each of the radial teeth 98 of the first and second members 54, 56 has a particular involute geometry in which each tooth has a relatively flat end 132 and relatively convex curved sides 134. Neighboring ones of the teeth 98 are separated from one another by relatively flat portions 136. Further as shown in FIG. 4, when neighboring teeth 98 of the two members 54, 56 are in contact or engaged with one another, typically pressure between the engaged teeth occurs along the curved surfaces 134 of those teeth. For example, as shown in FIG. 4, two of the teeth 98 of the members 54, 56 are engaged along respective sides 134 such that force or pressure is exerted between the members 54, 56 at an approximately 22 degree angle as measured with respect to an intermediate axis 137 that is positioned exactly between the members 54, 56 and perpendicular to another axis 139 that connects central axes 144 of the members.

As shown from a comparison of FIGS. 4 and 6, the members 54, 56 are rotatable between the torque transmitting position shown in FIG. 4 in which the lugs 64, 66 and extensions 130 are at their maximum distances apart from one another, and a locked position shown in FIG. 6 in which both of the members have been rotated so that the extensions 130 and lugs 64, 66 are in contact with one another. In the locked position of FIG. 6, the members 54, 56 are locked in stable (or quasi-stable) rotational positions other than the torque transmitting position. That is, despite a spring torque 141 exerted upon the member 54 due to the resilient element 78 (shown to be acting in a clockwise direction in FIG. 6), the members 54, 56 will not rotate to leave the locked state and return to the torque transmitting position without the application of an additional release torque 143 to the member 56 (in this case, in the counterclockwise direction).

The members 54, 56 are able to enter and stably remain in this locked position as follows. First, the members 54, 56 are respectively rotated counter-clockwise and clockwise from the torque transmitting position until the last radial tooth 98 (tooth A) of the member 54 clears an addendum circle 140 that is at the outermost extent of the teeth of the other member 56. As shown in FIG. 6, the tooth A has been rotated as so that its trailing side 134 is just at or outside the addendum circle 140. Given that the tooth A is outside the addendum circle 140, and given the absence of additional teeth that succeed that last tooth, the teeth 98 of the member 56 are capable of sliding past the tooth A as the member 56 rotates so as to begin to come out of alignment with the teeth of the member 54. However, the rotation of the member 56 relative to the member 54 cannot proceed indefinitely because the extensions 130 of the members 54, 56 (and the lugs 64, 66) come into contact with one another. The extensions 130 are designed to have sufficient length so that the last tooth 98 (tooth B) of the member 56 only can rotate so that its flat end 132 rests against the trailing side surface 134 of the tooth A (the extensions 130 are long enough to prevent the tooth B of the member 56 from rotating beyond an addendum circle 150 of the member 54). Once teeth A and B encounter one another in this manner, friction develops between the two teeth tending to prevent further rotation of the member 56 in either direction relative to the member 54.

Although the spring torque 141 created by the resilient member 78 tends to rotate the member 54 out of the locked position, it is in part the force created by that same resilient member that tends to lock the member 54 in the locked position. As shown, the pressure that exists between the members 54 and 56 when in the locked position is such that a pressure line 142 extends in a direction that tends to rotate the members 54, 56 in directions opposite those of the spring torque 141 and release torque 143. In particular, in the case shown in FIG. 6, the pressure line extends below the central axes of each of the members 54, 56. Thus, pressure between the members 54, 56 tends to maintain the members in the locked position. So long as the tooth A is in contact with the tooth B at some point along the flat end 132 of the tooth B (within a region A as shown in FIG. 6), the pressure line 142 between the gears remains below the central axes 144 and consequently the members 54, 56 remain in the locked state due to the pressure between them and further due to the friction between the teeth A and B.

The embodiment of the driven coupler 38 with the members 54 and 56 shown in FIGS. 4 and 6 has several features that make it possible for the members to attain both the torque transmitting position shown in FIG. 4 and the locked position shown in FIG. 6. First, the number, size and shape of the teeth 98 are such that one of the members (in this case, the member 54) can be moved to a position in which all of its radial teeth 98 are outside the addendum circle 140, such that the teeth 98 of the members 54, 56 can come out of engagement and the tooth B can begin sliding past the tooth A. Second, the involute shape in particular of the teeth 98 (especially the teeth A and B) make it possible for the tooth B to become locked in position relative to the tooth A in a quasi-stable manner. That is, even though the member 56 may experience some rotational forces tending to rotate the tooth B relative to the tooth A, the flat end 132 remains in contact with the curved side 134 of the tooth A due both to friction and to the relatively significant width of the end so that the pressure line 142 remains below the central axes 144 of the members 54, 56.

Third, the number, size and shape of the teeth 98 are such that, when the members 54,56 are appropriately rotated and positioned in relation to one another, the torque created by the resilient element 78 creates force that tends to oppose rotation of the members 54,56 out of the locked state even though that torque (in the absence of any interfacing teeth) tends to bias the member 54 toward the torque-transmitting position. Fourth, the extensions 130 of each of the members 54, 56 are designed to have specific lengths that, while not being so long as to preclude the members 54, 56 from coming out of alignment with one another, additionally are sufficiently long that they preclude the members from rotating completely independently of the member 54. In particular, the lengths are selected so that the member 56 is only capable of rotating out of alignment with respect to the member 54 to a sufficient degree that the flat end 132 of the tooth B reaches the appropriate side region 134 of the tooth A (that is, so that the side portion 134 is in contact with tooth B within the A region).

Although not shown, the members 54, 56 can enter another locked position if the respective members are rotated clockwise and counterclockwise, respectively, from the torque-transmitting position so that they reach rotational positions that are substantially opposite to those shown in FIG. 6. To reach that locked position, an opposite last one of the teeth 98 (tooth C) of the member 56 must rotate sufficiently far so as to be outside of the addendum circle 150 corresponding to the member 54 so that a last one of the teeth (tooth D) of the member 54 can slide out of alignment with the tooth C. In such case, the extensions 130 again come into contact with one another and prevent relative rotation of the member 54 with respect to the member 56 beyond points at which the flat end 132 of the tooth D is in contact with the trailing side surface 134 of the tooth C. Thus, in the present embodiment, there are actually two locked positions, which can be reached by rotating the members 54, 56 away from the torque transmitting position in two different manners.

A further characteristic of the present embodiment is that the resilient elements 78, 80 that bias the members 54, 56 toward the torque transmitting position are unidirectional. That is, the resilient member 78 tending to move the member 54 toward the torque transmitting position only operates to provide such torque when the member 54 is rotated in a direction counterclockwise from the torque transmitting position such as that shown in FIG. 6, but not when it has been rotated clockwise from the torque transmitting position. Similarly, the resilient element 80 only tends to rotate the member 56 toward the torque transmitting position when that member has been rotated in a direction counterclockwise from the torque transmitting position, but not when it has been rotated in a direction clockwise from the torque transmitting position. The unidirectional operation of the resilient elements 78, 80 is of significance insofar as, if the resilient elements were bi-directional, the resilient elements would tend to cause the members 54, 56 to fall out of their locked positions. For example, with respect to FIG. 6. the members 54, 56 are relatively stable in the locked position in part because no spring torque is being applied by the resilient element 80 in the direction of the release torque 143. If such torque were present, the torque would tend to rotate the tooth B away from the tooth A and release the members 54, 56 out of the locked position. The same would be true with respect to the alternate locked position if the resilient element 78 exerted torque upon the member 54 when it was rotated in the clockwise direction relative to the torque transmitting position.

Figure 7A:
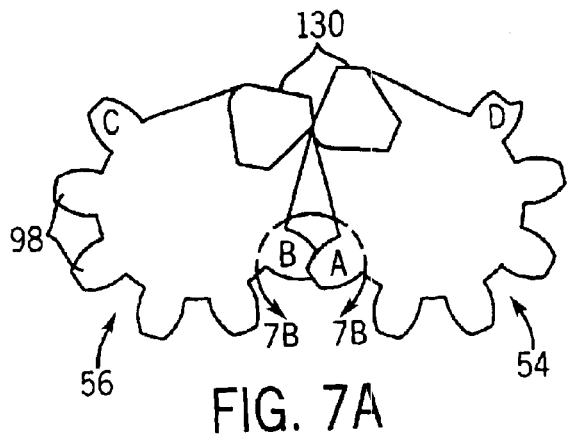
FIGS. 7A and 8A are front elevation views of first and second alternate embodiments of the first and second members of the driven coupler of FIG. 6 in which a gear tooth of either the first or second member has a detent, respectively.
Figure 7B:
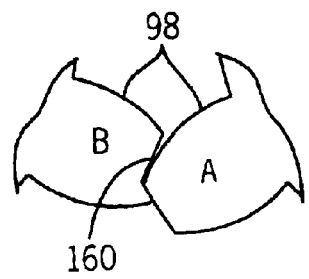
FIGS. 7B and 8B are enlarged views of portions of FIGS. 7A and 8A, respectively.
Figure 8A:
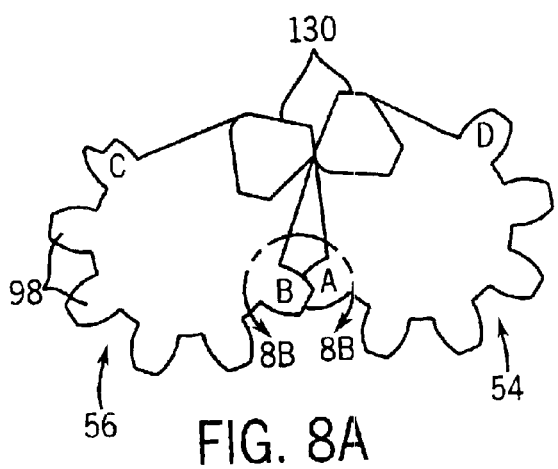
Figure 8B:
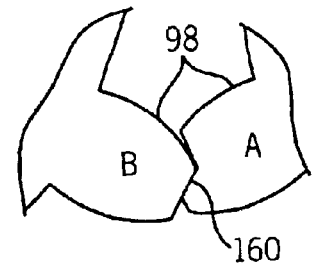

A variety of alternate embodiments other than that of FIGS. 4 and 6 are possible that would allow the members 54,

56 to similarly enter a locked position in addition to the torque transmitting position. For example, as shown in FIGS. 7A, 7B, 8A and 8B, one of the teeth A or B could include a detent or indentation 160 such that the teeth would be more securely locked in position relative to one another in a manner that did not depend as much upon the existence of friction between an end surface of one of the teeth and a side surface of the other. In particular, FIGS. 7A and 7B show an embodiment in which the tooth B includes the indentation 160. If such an embodiment was employed, then the members 54, 56 could only be released from the locked state shown in FIG. 7A if an appropriate releasing torque was applied to the member 54 simultaneously while the member 56 was appropriately rotated or indexed so that a return to the proper alignment between the teeth A and B could be achieved. FIGS. 8A and 8B show another embodiment in which the tooth A includes the indentation 160 to receive the tooth B, such that again the members 54, 56 could leave the locked position if the member 54 was appropriately rotated simultaneously with appropriate rotation and indexing of the member 56. The embodiments of FIGS. 7A, 7B, 8A and BB would provide sufficient locking stability that bi-directional resilient elements could be employed in place of the unidirectional resilient elements 78, 80 discussed above with respect to FIG. 6. That is, it would be possible to employ resilient elements that tended to bring back each of the members 54, 56 to the torque transmitting position regardless of how the members were rotated out of the torque transmitting position. As shown, in FIGS. 7A and 8A, in such embodiments it would be equally appropriate to provide similar detents or indentations 160 within tooth D and tooth C, respectively.

Figure 9:
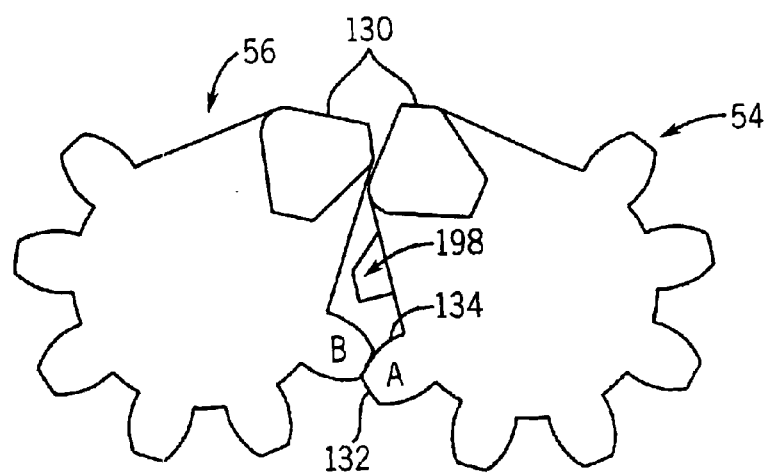
FIG. 9 is a front elevation view of an alternate embodiment of first and second members that could be used in place of the first and second members of FIGS. 2–5.

A further alternate embodiment is shown in FIG. 9. In such embodiment, at least one of the members 54, 56 (in this case the member 54) includes an additional partial tooth 198 that extends outward from a side of the extension 130 of that member at a location beyond the trailing side 134 of the tooth A. The partial tooth 198 operates to prevent the other member 56 from rotating indiscriminately (particularly in the counter-clockwise direction) relative to the member 54 once the tooth A has rotated beyond the addendum circle 140 corresponding to the member 56. A similar partial tooth could be employed on the extension 130 of the member 56. Other alternate embodiments are also possible. For example, the teeth 98 could employ other shapes than the involute shape, for example, a simple square shape or a trapezoidal shape.

Also, while the members 54, 56 shown in FIGS. 4 and 6 are symmetrical and can achieve two different locked positions depending upon how the members are rotated, symmetrical members need not be employed and it would be possible for asymmetrical members to be employed that could only attain a single locked position. Further, although FIG. 6 shows the members 54 and 56 to be rotationally orientated in relation to one another so that it is the trailing side 134 of the tooth A that is in contact with the flat end 132 of the tooth B, the members could be adjusted in their rotational positions so that it was the trailing side of tooth B that encountered the flat end of the tooth A.

Also, the present invention is intended to encompass a variety of different embodiments that employ different numbers of teeth or employ extensions with different shapes or sizes. Additionally, it is not necessary for the lugs 64, 66 to come into contact when the members 54, 56 are in the locked position. Rather, the lugs could be positioned at other locations other than at the ends of or on the extensions 130, so long as the extensions or some other features of the members 54, 56 come into contact as the members are rotated to the locked position in order to prevent one or both of the members from rotating beyond the quasi-stable locked position. Further, while in the embodiments shown it is the driven coupler that includes the support and first and second members rather than the drive coupler, in alternate embodiments it is possible for the drive coupler to include the support and first and second members rather than the driven coupler.

To apprise the public of the scope of this invention, the following claims are made:

What is claimed is:

1. A drive coupling system comprising:
   a rotatable drive shaft;
   a driven shaft;
   a first torque coupler coupled to one of the drive shaft and the driven shaft, the first torque coupler including first and second lugs; and
   a second torque coupler coupled to the other of the drive shaft and the driven shaft and including:
      a support;
      a first member rotatably coupled to the support and including a first extension and a first plurality of gear teeth that extend only partly around the first member;
      a second member rotatably coupled to the support and including a second extension and a second plurality of gear teeth that extend only partly around the second member;
   wherein the first and second members are capable of being respectively rotated to first and second rotational positions beyond which the first plurality of gear teeth are able to at least begin to slip out of alignment with the second plurality of gear teeth;
   wherein the relative slipping of the first plurality of gear teeth with respect to the second plurality of gear teeth is limited due to contact occurring between the first and second extensions as the slipping occurs; and
   wherein, as the relative slipping occurs, a first gear tooth of one of the first and second pluralities of gear teeth interfaces a second gear tooth of the other plurality of gear teeth so that the first member becomes locked in position in relation to the second member.

2. The drive coupling system of claim 1, wherein each of the first and second gear teeth has an involute shape.

3. The drive coupling system of claim 2, wherein the first member becomes locked in position in relation to the second member when a flat end of the first gear tooth interfaces a convex curved side surface of the second gear tooth.

4. The drive coupling system of claim 3, wherein the first gear tooth tends not move relative to the second gear tooth due at least in part due to frictional forces existing therebetween.

5. The drive coupling system of claim 3, wherein at least one of the first and second members is at least partly rotationally biased toward a torque transmitting position by at least one resilient member coupled to the at least one member.

6. The drive coupling system of claim 5 wherein, when the first and second gear teeth interface one another, opposing forces occur between the first and second gear teeth along a first pressure line that extends on first and second sides of first and second central axes of the first and second members, respectively, wherein the opposing forces along the first pressure line tend to oppose rotational movement in accordance with the biasing provided by the resilient member.

7. The drive coupling system of claim 6, wherein the resilient member is a torsion spring, and wherein the resilient member provides unidirectional biasing.

8. The drive coupling system of claim 1, wherein at least one of the first and second gear teeth includes an indentation capable of receiving at least a portion of an outer surface of the other of the gear teeth.

9. The drive coupling system of claim 8, wherein at least one of the first and second members is at least partly rotationally biased toward a torque transmitting position by at least one resilient member coupled to the at least one member.

10. The drive coupling system of claim 9, wherein the first and second members are rotationally biased toward the torque transmitting position by first and second resilient members, each of which provides bidirectional biasing.

11. The drive coupling system of claim 1, wherein the first and second members respectively support a third lug and a fourth lug.

12. The drive coupling system of claim 4, wherein the first extension supports the third lug and the second extension supports the fourth lug.

13. The drive coupling system of claim 1, wherein the first and second extensions are sufficiently short in extent so as to allow the first gear tooth to rotate beyond a first addendum circle associated with the second member, and sufficiently long in extent so as to prevent the second gear tooth from rotating beyond a second addendum circle associated with the first member.

14. The drive coupling system of claim 1, wherein the second torque coupler is coupled to the driven shaft.

15. The drive coupling system of claim 1, wherein due to engagement of at least some of the gear teeth of the first and second pluralities of gear teeth, the first and second members are at least partly restricted to rotational motions that are in opposition to one another.

16. The drive coupling system of claim 1,
wherein as the relative slipping occurs, the first gear tooth on the first member exits a first addendum circle of the second member such that the second gear tooth on the second member is able to begin slipping past the first gear tooth toward the locked position by rotating in a first rotational direction; and
further comprising an additional partial tooth on the first member adjacent to the first gear tooth that is sufficiently short so as to not prevent the contact between the first and second extensions and sufficiently long so as to interface the second gear tooth when the second gear tooth rotates in a second rotational direction opposite the first rotational direction away from the locked position.

17. A lock-out mechanism for implementation in a drive coupling system, the lock-out mechanism comprising:
a support;
first and second members having first and second pluralities of gear teeth, respectively, first and second extensions, respectively, and first and second lugs, respectively;
wherein each of the first and second members is rotatably coupled to the support; and
wherein, due to engagement of at least some of the gear teeth of the first and second pluralities of gear teeth, the first and second members are at least partly restricted to rotational motions that are in opposition to one another;
means for biasing the first and second members toward rotational positions so that the first and second lugs are in first and second positions, respectively;
wherein the first and second members are capable of being rotated and locked in position so that the first and second lugs are locked in third and fourth positions, respectively; and
wherein the first and second members are locked in position when the first and second pluralities of gear teeth of the first and second members slip out of gear alignment so that a first gear tooth of one of the first and second pluralities of gear teeth is locked in relation to a second gear tooth of the other of the first and second pluralities of gear teeth.

18. The lock-out mechanism of claim 17, wherein the lock-out mechanism is in a torque-transmitting state when the first and second lugs are in the first and second positions, respectively, and is in a locked state when the first and second lugs are in the third and fourth positions, respectively.

19. The lock-out mechanism of claim 17, wherein the first and second extensions prevent excessive slipping of the first member in relation to the second member.

20. In a work vehicle employing a drive coupling system that includes a drive shaft and a driven shaft, first and second torque couplers respectively coupled to respective ones of the drive and driven shafts, first and second lugs fixedly positioned on a first support of the first torque coupler, first and second members rotatably coupled to a second support of the second torque coupler, third and fourth lugs fixedly positioned on the first and second members, respectively, wherein the first and second members respectively include first and second pluralities of gear teeth to allow for engagement between the first and second members, the first and second members being at least partly restricted by the pluralities of gear teeth to rotational movements in opposite directions in relation to one another, a method of disengaging a coupling of the first and second torque couplers, the method comprising:
applying a torque to at least one of the first and second members so that the first and second members respectively rotate to positions beyond which slipping can occur between the first and second pluralities of gear teeth of the first and second members; and
applying a further torque to one of the first and second members so that a first gear tooth of the one member becomes wedged against a second gear tooth of the other of the first and second members, wherein the wedging of the first gear tooth against the second gear tooth locks both teeth and both members substantially in their respective positions.

* * * * *